R. EATON.
Adjustable Car Wheels.

No. 99,418.  Patented Feb. 1, 1870.

Witnesses.
F. W. Howard
H. S. Miller

Inventor.
Richard Eaton
By David A. Burr
Atty.

United States Patent Office.

RICHARD EATON, OF EATON LODGE, ENGLAND.

Letters Patent No. 99,418, dated February 1, 1870.

IMPROVED ADJUSTMENT OF WHEELS ON THE AXLES OF RAILWAY-CARS.

The Schedule referred to in these Letters Patent and making part of the same.

*To all whom it may concern:*

Be it known that I, RICHARD EATON, of Eaton Lodge, Kentish Town, in the county of Kent, England, have invented certain Improvements in the Adjustment of Wheels upon the Axles of Railroad-Cars, of which the following is a specification.

The first part of my invention relates to the combination of cams or eccentrics, formed upon a suitable shaft, with the "locking-wedges" or keys ordinarily employed to prevent a longitudinal movement of the wheel upon its axle, when set at the desired gauge, the object of this part of my invention being to provide a simple and effective means of lifting, lowering, and securely retaining in position said "locking-wedges."

The second part of my invention relates to the combination of a spring with the cam or eccentric shaft, operating the "locking-wedges," and with the box containing the bearings of said shaft, the object being to control the movements of the eccentric, and prevent accidental displacement thereof; and The third part of my invention relates to the combination of a screw-pin or bolt with the inner wedge, and with the end of the sleeve, from the wheel through which the wedge passes, or with a projection therefrom, for the purpose of locking said wedge, independently of the eccentric operating the same.

In the accompanying drawings, forming a part of this specification—

Figure 2:
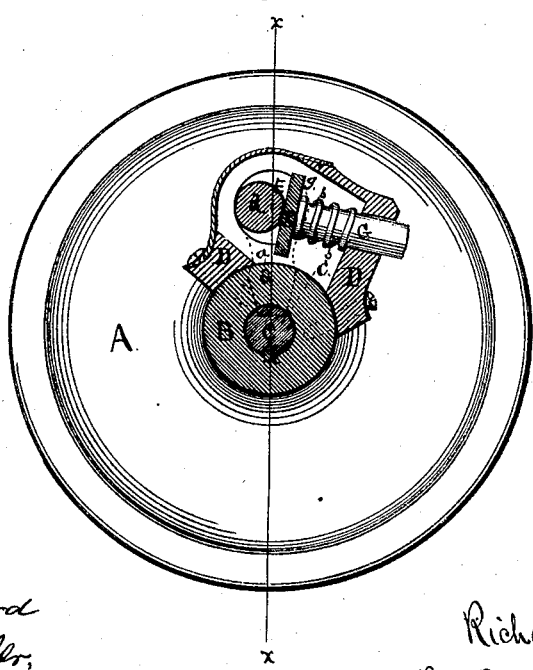
Figure 2 is a transverse section, showing those parts at the right hand of the line $y\ y$ of fig. 1, one of the "locking-wedges" being illustrated, in outline, by dotted lines.

A is the car-wheel, provided with an extended hub or "sleeve," B, properly bored to receive and fit accurately upon the axle C. This car-axle C has notches 1 2 3 4 cut therein, to receive the lower ends of "locking-wedges" $a\ a$, inserted through apertures pierced for the purpose radially through the sleeve or hub B. These apertures are elongated in a direction transverse to the length of the hub and axle, and the wedges $a\ a$ fit closely therein. (See dotted lines, fig. 2.)

$b\ b$ are springs, of India rubber, encircling the hub B, and which pass over the outer ends of the wedges $a\ a$, so as to exert an inward pressure thereon, and retain them in position.

$c$ is a feather, inserted longitudinally in the axle C, and which, projecting therefrom, fits into a corresponding groove cut longitudinally in the inner perimeter of the bore of the hub and wheel, so as to prevent a revolution of the wheel upon its axle.

All of these arrangements, as just described, are in common use, in connection with the wheels and axles under railroad-cars, running over roads in which there is a difference of gauge.

Figure 1:
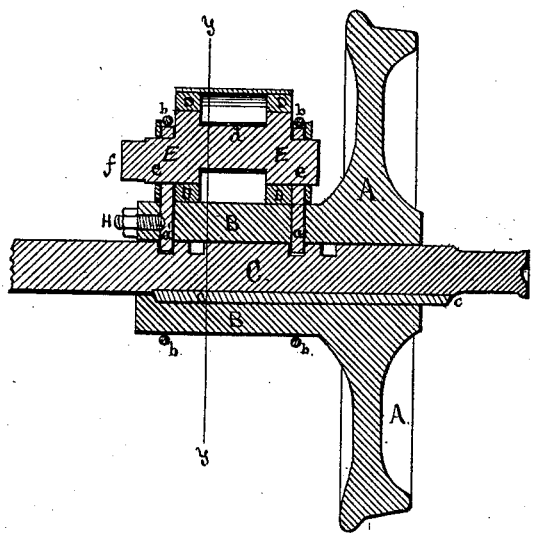
Figure 1 is a central section, through the axis of the wheel and axle, in the line $x\ x$ of fig. 2.

The present invention consists in securing the box or other suitable support D, upon the hub B, over the wedges $a\ a$, and in placing, within suitable bearings formed in the ends or sides of said box, a short rod or shaft, E, parallel to the axle, so that their axes shall be coincident, and having cams or eccentrics $e\ e$, fig. 1, formed thereon, to extend through apertures pierced to receive them, in the upper ends of the wedges $a\ a$, which are properly elongated for the purpose.

These eccentrics $e\ e$ are so arranged upon the shaft E, with relation to the wedges $a\ a$, as that when the wedges are let down into the notches in the axle, thus locking the wheels, and preventing a longitudinal movement thereof, the centres of said eccentrics shall be in a direct line with the axes of the shaft and axle, as illustrated in the drawings.

The outer end $f$, fig. 1, of the shaft E is left angular, to receive a spanner, for the purpose of turning the same.

$d$ is a third cam or eccentric, formed upon the shaft E, between the eccentrics $e\ e$, controlling the wedges $a\ a$.

G is a rod, having a flat head, $g$, which is encircled by a spiral spring, $s$, bearing against the inner surface of the box D, so as to force the head of the rod powerfully against the eccentric $d$. This eccentric is so formed, in relation to the remaining eccentrics $e\ e$, as that when they are down at their extreme lower point, as indicated in fig. 1 of the drawings, its centre shall be in a plane coincident with that of the axis of the rod G, or of the spring $s$, and be removed as far as possible therefrom. The outer end of the rod G projects slightly through the box D, so that it may have free play.

H, fig. 1, is a screw, inserted in a suitable threaded aperture in the end of the hub B, and whose inner end bears against the inner wedge $a'$, to still more effectually lock and fasten the same in place, when it is inserted into the notch of the axle.

The operation of the device, thus fully described, is as follows:

When the locking-wedges $a\ a'$ are engaged with the notches in the axle C, so that the wheels are in complete running order upon the proper gauge, they are held in place partly by the tension of the India-rubber springs $b\ b$, but principally by the position of the eccentrics $e\ e$, which, having their centres in a direct line extending through the axes of the car-axle C and shaft E, present a firm resistance to any outward thrust or movement of the locking-wedges $a\ a'$. Any tendency of the shaft E to revolve, and thus release the eccentrics $e\ e$, and liberate the wedges $a\ a'$, is checked by the action of the spring $s$ upon the central eccentric $d$, which thus acts as a powerful brake upon the shaft.

To make assurance doubly sure, the screw H is inserted, and its inner end, bearing against or passing slightly into the wedge $a'$, will effectually lock and secure the same.

When, however, it is desired to change the gauge, the screw H is withdrawn, and the shaft E and its eccentrics are turned a half revolution by means of a spanner applied to the angular end $f$. This movement forces back the spring $s$, and, by means of the eccentrics $e\ e$, raises the locking-wedges $a\ a$ clear of the axle, so that the wheel A is left free to move upon the axle, inward or outward, as may be required, until the desired gauge is attained, (the notches in the axle being cut to suit the different gauges.) At this point the eccentrics are turned back to their first position, forcing down the ends of the wedges into the notches in the axle, and the car is again ready to proceed on its way upon the new gauge of road.

The central eccentric $d$, on the shaft E, may be dispensed with, and a revolution of the shaft prevented by means of any ordinary catch or bolt.

Although I prefer to employ eccentrics upon the shaft E, for the purpose of raising, lowering, and securing the wedges or keys $a\ a'$, I contemplate, in my invention, substituting toothed wheels for said eccentrics upon the shaft E, to engage with counterpart racks upon the upper ends of the wedges or keys $a\ a$, and now claim the same as mechanical equivalents of the eccentrics. I claim, also, cranks or wrist-pins, secured to the shaft E, and engaging with the upper ends of the wedges or keys $a\ a'$, to elevate and depress the same, and retain them in position as mechanical equivalents for the eccentrics $e\ e$, herein described.

The screw H may be used for the purpose of securing the wedge $a'$, in connection with the ordinary arrangements of "locking-wedges" now in use, and independently of my devices for raising and lowering said wedges.

Two sets of wedges $a\ a'$, and of eccentric shafts E, may be used upon one wheel, at opposite points on the hub thereof, to facilitate the adjustment of the wheels to as many as four different gauges of roads.

I claim, as my invention—

1. The shaft E, carrying the eccentrics $e\ e$, or their equivalents, as herein described, in combination with the hub B and locking-wedges $a\ a'$ of a "changeable-gauge" car-wheel and axle, substantially as herein set forth.

2. The spring S, in combination with the eccentric $d$ upon the shaft E, and with the box D supporting the same, substantially as herein described.

RICHARD EATON.

Witnesses:
   GUY C. NOBLE,
   HENRY EATON.